(12) United States Patent
Lasser

(10) Patent No.: US 6,510,488 B2
(45) Date of Patent: Jan. 21, 2003

(54) METHOD FOR FAST WAKE-UP OF A FLASH MEMORY SYSTEM

(75) Inventor: Menahem Lasser, Kohav-Yair (IL)

(73) Assignee: M-Systems Flash Disk Pioneers Ltd., Kfar Saba (IL)

(*) Notice: Subject to any disclaimer, the term of this patent is extended or adjusted under 35 U.S.C. 154(b) by 63 days.

(21) Appl. No.: 09/775,499

(22) Filed: Feb. 5, 2001

(65) Prior Publication Data

US 2002/0108014 A1 Aug. 8, 2002

(51) Int. Cl.[7] .............................................. G06F 12/00
(52) U.S. Cl. ....................................... 711/103; 711/206
(58) Field of Search ................................. 711/103, 206

(56) References Cited

U.S. PATENT DOCUMENTS

| 5,375,222 A | 12/1994 | Robinson et al. |
| 5,404,485 A | 4/1995 | Ban |
| 5,645,068 A | 7/1997 | Mezack et al. |
| 5,937,425 A | 8/1999 | Ban |
| 5,974,528 A | 10/1999 | Tsai et al. |
| 6,377,500 B1 * | 4/2002 | Fujimoto et al. ...... 365/230.01 |

* cited by examiner

Primary Examiner—Jack A. Lane
(74) Attorney, Agent, or Firm—Mark M. Friedman

(57) ABSTRACT

A system and method for enabling a fast wake-up of a flash memory system, without compromising the integrity of the flash data structures and without risking loss of data. This is achieved by storing translation tables in the flash, but adding some means for the software to invalidate them in a way that is detectable whenever reading them. Possible implementations include adding a checksum value that makes the sum of all entries equal some fixed known value, or adding a validity flag to the stored tables, enabling the tables to be invalidated at will. In addition, one should ask the application software to call a specific function in the translation layer before shutting the system down. The present invention enables fast wake-ups when the application software made an orderly exit and made us store the tables. In the case an orderly exit was not made, the present invention commands a regular wake-up procedure, thereby ensuring data integrity.

11 Claims, 2 Drawing Sheets

METHOD FOR FAST WAKE-UP OF A FLASH MEMORY SYSTEM

FIELD AND BACKGROUND OF THE INVENTION

The present invention relates to a system and method for enabling a flash memory device to employ a rapid wake-up ability, while ensuring data integrity. This solves the potential problem of a time delay when initializing (mounting) a software driver or a file system using a flash-memory device.

Using flash memory devices for computer data storage traditionally requires some software translation layer that sits between the host computer's operating system and the device low-level access routines. This is so because the flash technology has some usage limitations, which make it impossible to access it in a simple random-access linear method. The main limitation is the inability to randomly overwrite any desired memory location—putting new content into a flash memory location requires first erasing the whole block containing that location (preserving the contents of any other locations still needed), and only then writing the new content.

The translation layer presents to the hosting operating system a virtual view of a random-access addressable array of independent data sectors, while hiding and taking care of all details of mapping those virtual addresses into their real locations in the flash media. This translation mechanism is far from trivial, and an example of such a flash memory translation layer can be seen in Amir Ban's U.S. Pat. No. 5,937,425, which is incorporated as if fully set forth herein. This patent shows a method for implementing a mapping mechanism between virtual and physical flash addresses. Another example of such as system is detailed in U.S. Pat. No. 5,404,485, that discloses a software management system that is required to manage these functions of the flash memory device, and which is incorporated as if fully set forth herein.

The translation process relies on internal translation tables that provide the software with the information required for converting the host computer data access requests to the actual flash access requests. These tables are constructed by the software during system wake-up (or at later time, if so requested by the hosting software), based on control information stored within the flash device. Even though it is theoretically possible not to construct such tables and instead use only the raw control data from the flash, this is practically unusable as the response time to an access request would be too slow. This is so because accessing data on flash is much slower than accessing data in regular computer RAM memory, and also because the memory tables are usually optimized for efficiency in the type of operations required during runtime, while the flash-stored control data is not. For example, a flash physical unit might contain the number of the virtual unit mapped to it. During program runtime we frequently need to translate a virtual unit number into its physical counterpart. If we have to rely only on flash-stored control data, we must scan all units until we find one with the specified virtual unit number, a very long process by the standards of a simple media access. However, by scanning the flash device once on system wake-up and constructing a table mapping each virtual unit number into a corresponding physical unit number, we are able to later do such mappings very efficiently.

The Problem

Scanning the flash data storage device on system wake-up might take a long time, especially for high capacity devices. This is especially annoying for systems and devices in which a user expects immediate turn-on (i.e. cellular phones, PDAs, etc.). The obvious solution of storing the tables in the flash will work for read-only devices, such as flash devices storing only computer executable code, which is not changeable by the user. However this solution will not succeed when using devices used to store data which might be changing frequently (such as text files or spreadsheets in a PDA). This is so because when continuously writing to the device and changing its contents, the contents of the translation tables also change. It is not practical to update the copy of the tables in the flash each time they change in memory, because the incurred overhead will slow the system considerably. Consequently, a difference will be accumulated between the tables stored in flash and the "correct" ones in memory. Now if the user switches the power off and then turns it back on, without updating the tables, the software will read incorrect translation tables from flash, and the results might be data loss when writing new data.

There is thus a widely recognized need for, and it would be highly advantageous to have, a system that can provide a fast wake-up of the flash memory system, without compromising the integrity of the flash data structures and without risking loss of data. There is a further need to achieve this without significantly slowing down system performance.

According to the present invention, this problem is solved by storing translation tables in the flash, but adding some means for the software to invalidate them in a way that is detectable whenever reading them. Possible implementations (but not the only implementations) include adding a checksum value that makes the sum of all entries equal some fixed known value, or adding a validity flag to the stored tables. Additionally, one should ask the application software to call a specific function in the translation layer before shutting the system down.

In these ways the flash memory device is able to initiate fast wake-ups when the system undergoes an orderly shut down, and reverts to regular wake-ups when the system undergoes an un-orderly shut down.

SUMMARY OF THE INVENTION

According to the present invention there is provided a system for storing the translation tables in the flash memory, but adding some means for the software to invalidate them in a way that is detectable whenever reading them. The system comprises:

i. Hardware computing device;

ii Non volatile flash memory data storage device, with at least one translation table, used for accessing the flash device, and iii. flash device low level software access routines;

iv. Translation layer for presenting to the higher software levels a virtual view of a random-access addressable array of independent data sectors;

v. a host computer operating system or any other software layer on top of the translation layer;

vi. software for controlling access to and use of translation tables.

The present invention provides for a non-volatile memory system that includes translation tables and software that enables fast wake-up of computer storage devices. The present invention incorporates a system for storing the translation tables in the flash, and in addition to this, to adding some means for the software to invalidate them in a way that is detectable whenever reading them. Possible implementations (but not the only ones) include adding a checksum value that makes the sum of all entries equal some fixed known value or adding a validity flag to the tables. When we want to invalidate the data, we simply change the checksum value (or any other entry in the tables), thus causing the sum to differ from the anticipated value, or, if a validity flag is used instead of the checksum, then one simply changes the value of the flag, to indicate a non-valid state. Additionally, we ask the application software to call a specific function in the translation layer before shutting the system down.

According to the preferred embodiment of the present invention, there is provided a method for enabling fast wake-up of a memory device, while always maintaining data integrity, including the steps of:

(a) storing at least one translation table in the flash memory component;

(b) adding a software means for invalidating the table after wake-up; and (c) providing a specific function in the translation layer for verifying an orderly shutdown of the flash memory component, in which an up-to-date copy of the translation table is stored into the flash device in order to enable a fast wake-up. According to an additional feature of the preferred embodiment of the present invention, there is provided a method for ensuring fast wake-up and data integrity, that including the steps of:.

i. If application software made an orderly exit and made the device store the updated tables, the next wake-up will be able to use the tables and have a fast turn-on; and ii. If application software made a non-orderly exit, a regular wake-up procedure is initiated, thereby ensuring data integrity.

It should be understood by someone who is skilled in the art of solid-state storage system development, that the inventive methods and systems described herein may be used to develop further embodiments. The above-mentioned embodiments are to be seen as examples, and are in no way meant to limit the technology described herein to these examples alone.

BRIEF DESCRIPTION OF THE DRAWINGS

The invention is herein described, by way of example only, with reference to the accompanying drawings, wherein.

DESCRIPTION OF THE PREFERRED EMBODIMENT

The present invention is of a system and method for enabling fast wake-up of flash memory devices used for computer data storage.

Specifically, the present invention can enable such a fast wake-up by invalidating translation tables in a way that is detectable whenever reading them.

Figure 1:
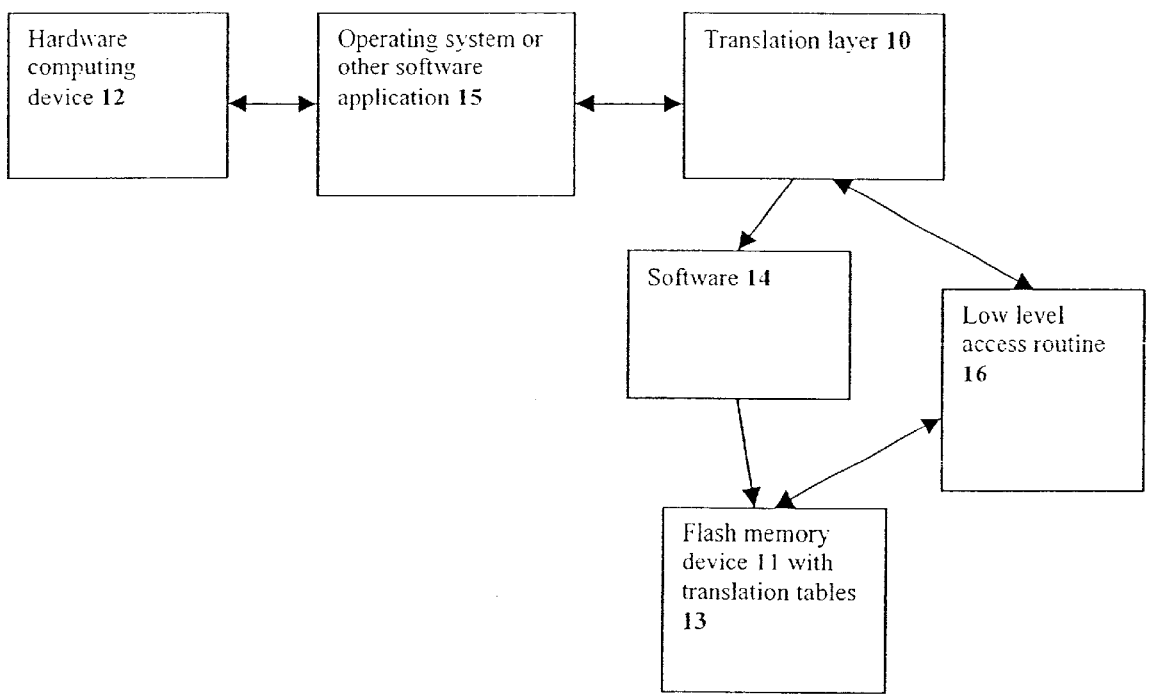
FIG. 1 is an illustration of the components of the present invention, and the interaction between them.

The principles and operations of such a system according to the present invention may be better understood with reference to the drawings, and the accompanying descriptions, wherein:

FIG. 1 illustrates the basic components and operations of the current invention in its preferred usage. The components of the present invention include:

i. a hardware computing device for accessing the flash memory device 12;

ii. a non volatile flash memory data storage device for storing data of the hardware computing device 11; wherein there is at least one translation table 13 for providing a translation layer (see point iv.) with information required for converting an upper layers' data access request to a flash access request;

iii. flash device low level software access routines for providing access to the flash device contents 16;

iv. a translation layer 10 for presenting to higher software levels a virtual view of a random-access storage device;

v. a software mechanism, which may include a host computer operating system or any other software layer 15 on top of the translation layer, for enabling the processing of data; and vi. software 14 for controlling access and use of translation tables.

According to FIG. 1, it can be seen that the translation table or tables 13 are stored in the flash memory 11. There is also provided some means for the software 14 to invalidate them, in a way that is detectable whenever reading them. A possible implementation (but not the only one) is adding a checksum value that makes the sum of all entries equal some fixed known value or adding a validity flag to the tables. When we want to invalidate the data, we simply change the checksum value (or any other entry in the tables), thus causing the sum to differ from the anticipated value, or if a validity flag is used instead of the checksum, then one simply changes the value of the flag to indicate a non-valid state. The reason why we may want to invalidate the data is to be able to speed up the wake-up time on most wake-ups, while ensuring that we never use incorrect tables on wake-up, even if the device was not shut down properly and the stored tables are not up-to-date. Additionally, we ask the application software to call a specific function in the translation layer 10 before shutting the system down. In this way the software gets the opportunity to save an up-to date copy of the translation tables 13 in the flash memory 11 before shutting down.

Figure 2:
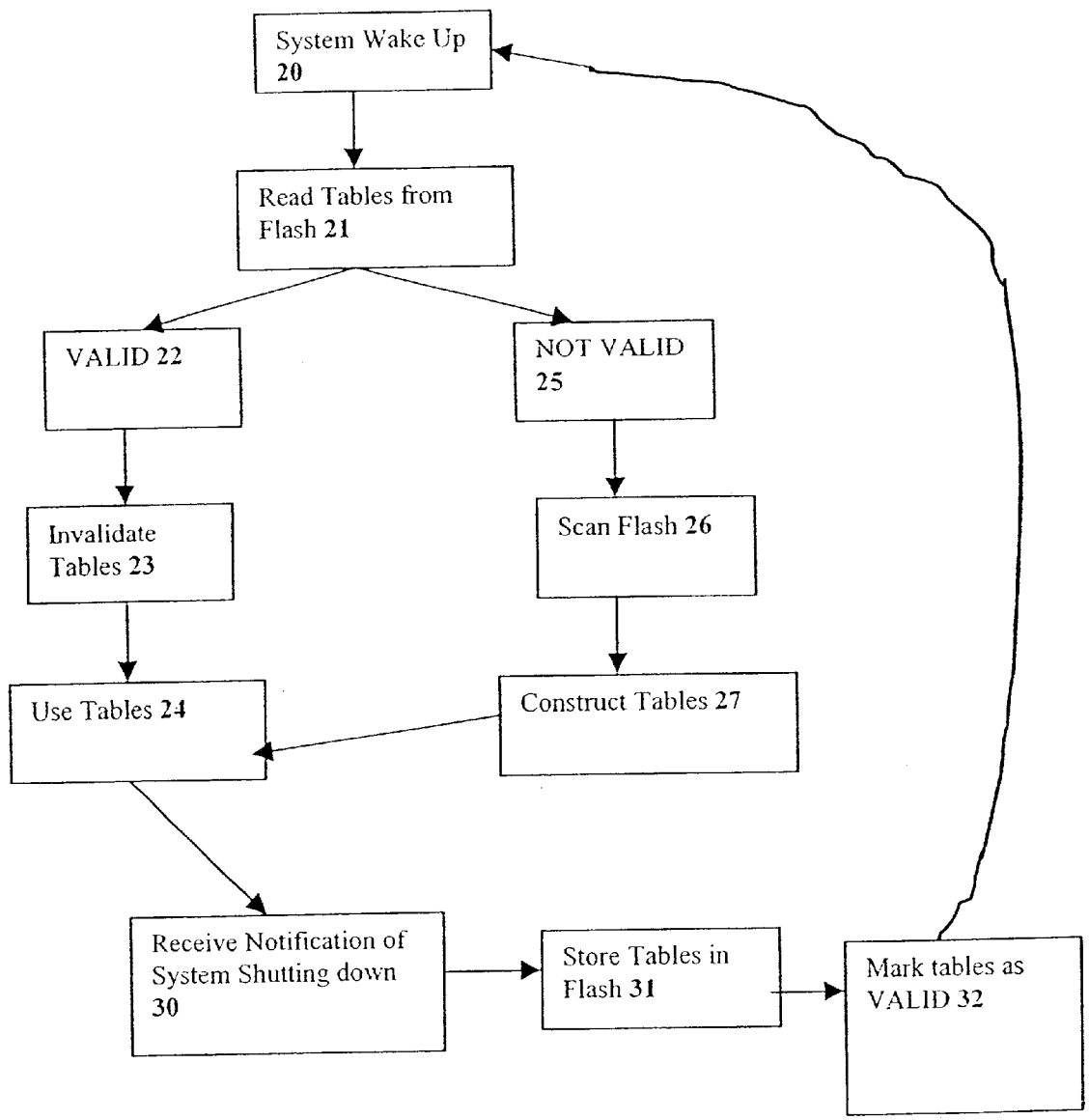
FIG. 2 describes the steps involved from system wake up to shut down.

The following algorithm is then implemented, as can be seen in FIG. 2:

A. When waking up 20

Read translation table from the flash memory device 21

If the translation table is found to be valid 22

Invalidate the table 23, as protection against an unexpected shutdown.

use the table 24 without having to scan the whole flash memory system;

Else (that is—tables not valid) 25

Scan flash memory system 26 and construct an updated translation table 27.

Use table as before 24

B. When being notified 30 on shutdown of the flash memory system, store the current or most updated copy of the tables in the flash memory system 31, in a way that will be recognized as valid on next wake-up 32.

The results of the above algorithm are the following:

If the application software made an orderly exit and made us store the tables, the next wake-up will be able to use the tables and have a fast turn-on/wake-up.

If not, we still keep the integrity of the data, even though we do not improve the wake-up time.

Possible Variations

The invalidation of the tables can be delayed to any time following the system wake-up, until any later time which is still prior to the first occasion which causes a change to the flash content. Thus if the system was turned off without writing new data into the flash, we shall still have fast turn-on next time, even if the system was shut down without advance notice.

While the invention has been described with respect to a limited number of embodiments, it will be appreciated that many variations, modifications and other applications of the invention may be made.

What is claimed is:

1. A system for enabling fast wake-up of a flash memory device, such that data integrity is always maintained, comprising:
   i. a hardware computing device for accessing the flash memory device;
   ii. a non volatile flash memory data storage device for storing data of said hardware computing device, such that there is at least one translation table in said flash memory data storage device, for providing a translation layer with information required for converting a data access request to a flash access request;
   iii. flash device low level software access routines, for providing access to content of the flash memory device;
   iv. a translation layer for presenting a virtual view of said non-volatile flash memory device as a random access storage device;
   v. a software mechanism selected from the group consisting of a host computer operating system and any other software program, for enabling the processing of data of said hardware computing device; and
   vi. software for controlling access and use of said translation table, which enables fast wake-up of the system.

2. The system of claim 1, wherein said software uses a checksum value for controlling validation of said translation table.

3. The system of claim 1, wherein said software uses a validity flag for controlling validation of said translation table.

4. A method for enabling fast wake-up of a flash memory device, such that data integrity is ensured, comprising the steps of:
   i. storing at least one translation table in the flash memory device;
   ii. adding a software means for invalidating said table of the flash memory device; and
   iii. providing a translation layer with a function for verifying an orderly shutdown of the flash memory device, such that a fast wake-up is enabled.

5. The method of claim 4, wherein said function further includes instructions for storing an up-to-date copy of said translation table, prior to an orderly system shutdown.

6. The method of claim 4, wherein said software means is a checksum value.

7. The method of claim 4, wherein said software means is a validity flag.

8. A method for enabling fast wake-up of a flash memory system, such that data integrity is assured, comprising the steps of:
   I. When waking up:
      i. Reading translation table from the flash memory system;
      ii If said translation table is found to be valid
         iia.—Invalidating said table
         iib.—using said table without having to scan the whole flash memory system;
      iii. Else
         iiia.—Scanning said flash memory system and constructing an updated translation table;
         iiib.—Using said table as in iib;
   B. When the flash memory system is notified prior to a shutdown, storing an updated copy of said table in said flash memory system in a way that will be recognized as valid on next wake-up.

9. The method of claim 8, further including the steps of:
   a. If application software using the flash memory system made an orderly exit and stored an updated translation table, then said application software enables next wake-up to use said table; and
   b. If said application software made a non-orderly exit, then said application software initiates a regular wake-up procedure.

10. The method of claim 9, wherein said invalidation of said table is delayed until after wake-up, until a later time which is still prior to a first access to the flash memory system which causes a change to flash content.

11. The method of claim 8, wherein said invalidation of said table is delayed until after wake-up, until a later time which is still prior to a first access to the flash memory system which causes a change to flash content.

* * * * *